United States Patent
Seo et al.

(10) Patent No.: US 9,671,252 B2
(45) Date of Patent: Jun. 6, 2017

(54) APPARATUS OF DETECTING CAPACITANCE

(71) Applicants: HYUNDAI MOTOR COMPANY, Seoul (KR); HYUNDAI MOBIS CO., LTD., Seoul (KR)

(72) Inventors: Haijin Seo, Yongin-si (KR); Wonho Shin, Seoul (KR); Jongil Yu, Seongnam-si (KR); Heungjoo Choi, Yongin-si (KR); Jongchul Lim, Anyang-si (KR); Youngjun Jang, Icheon-si (KR)

(73) Assignees: Hyundai Motor Company, Seoul (KR); Hyundai Mobis Co., Ltd., Seoul (KR)

( * ) Notice: Subject to any disclaimer, the term of this patent is extended or adjusted under 35 U.S.C. 154(b) by 267 days.

(21) Appl. No.: 14/517,343

(22) Filed: Oct. 17, 2014

(65) Prior Publication Data

US 2015/0160277 A1 Jun. 11, 2015

(30) Foreign Application Priority Data

Dec. 10, 2013 (KR) .......... 10-2013-0153469

(51) Int. Cl.
  *G01R 27/26* (2006.01)
  *G01D 5/24* (2006.01)
(52) U.S. Cl.
  CPC ................ *G01D 5/24* (2013.01)
(58) Field of Classification Search
  CPC ..... G01R 27/2605; G06K 9/0002; G01D 5/24
  USPC ................. 324/686, 658, 691, 669
  See application file for complete search history.

(56) References Cited

U.S. PATENT DOCUMENTS

| | | | |
|---|---|---|---|
| 3,623,159 A * | 11/1971 | Bell ............... | G08B 13/26 340/564 |
| 4,031,509 A * | 6/1977 | Matulevich ......... | B60K 28/00 303/122.06 |
| 6,118,348 A * | 9/2000 | Narahara ............ | H03B 5/364 331/116 FE |

(Continued)

FOREIGN PATENT DOCUMENTS

| JP | 2784396 B2 | 8/1998 |
|---|---|---|
| JP | 11-002504 A | 6/1999 |
| KR | 10-0995240 B1 | 11/2010 |

*Primary Examiner* — Tung X Nguyen
*Assistant Examiner* — Dominic Hawkins
(74) *Attorney, Agent, or Firm* — McDermott Will & Emery LLP

(57) ABSTRACT

An apparatus of detecting capacitance detects a capacitance change of a capacitive sensor. The apparatus includes a pulse modulator configured to output a charging signal including at least one pulse. A switch is configured to charge the capacitive sensor according to the charging signal and output a discharging signal from the capacitive sensor. A discharging compensator is configured to output a discharging delay signal by compensating a voltage level of the discharging signal during a falling period of the discharging signal. A detector is configured to output a detection signal by detecting a region where the discharging delay signal has a voltage threshold. A controller is configured to detect the capacitance change by measuring a discharging time of the capacitive sensor according to the detection signal.

9 Claims, 3 Drawing Sheets

(56) References Cited

U.S. PATENT DOCUMENTS

| | | | | |
|---|---|---|---|---|
| 6,731,129 B1* | 5/2004 | Belluomini | G01R 27/2605 | 324/678 |
| 7,772,916 B2* | 8/2010 | Im | H02M 3/07 | 327/534 |
| 7,994,823 B2* | 8/2011 | Lee | H03K 3/356191 | 326/93 |
| 8,446,158 B1* | 5/2013 | Jansson | H03K 17/9622 | 324/601 |
| 8,618,848 B1* | 12/2013 | Chee | H03K 4/063 | 327/131 |
| 8,656,238 B2* | 2/2014 | Lee | G06F 11/24 | 714/726 |
| 2003/0210025 A1* | 11/2003 | Ishii | H02M 3/1582 | 323/284 |
| 2005/0117413 A1* | 6/2005 | Kang | G11C 7/06 | 365/194 |
| 2006/0055417 A1* | 3/2006 | Lee | G01R 27/2605 | 324/681 |
| 2007/0002652 A1* | 1/2007 | Jeong | G11C 7/12 | 365/203 |
| 2009/0302871 A1* | 12/2009 | Lee | G01D 5/24 | 324/674 |
| 2010/0321956 A1* | 12/2010 | Yeh | H02M 3/33507 | 363/16 |
| 2012/0001869 A1* | 1/2012 | Ito | G06F 3/03547 | 345/174 |
| 2013/0008871 A1* | 1/2013 | Sato | H01J 37/321 | 216/86 |
| 2013/0229216 A1* | 9/2013 | Wu | H03K 5/06 | 327/175 |
| 2014/0007676 A1* | 1/2014 | Armstrong | G01F 23/265 | 73/304 C |
| 2015/0145535 A1* | 5/2015 | Nys | G06F 3/0418 | 324/679 |
| 2015/0155032 A1* | 6/2015 | Tong | G11C 8/18 | 365/154 |

* cited by examiner

APPARATUS OF DETECTING CAPACITANCE

CROSS-REFERENCE TO RELATED APPLICATION

This application claims the benefit of priority to Korean Patent Application No. 10-2013-0153469 filed in the Korean Intellectual Property Office on Dec. 10, 2013, the entire contents of which are incorporated herein by reference.

TECHNICAL FIELD

The present disclosure relates to an apparatus of detecting capacitance. More particularly, the present disclosure relates to an apparatus of detecting capacitance that charges/discharges a capacitive sensor by a set number of times and prevents a malfunction according to a noise.

BACKGROUND

A capacitive sensor senses a capacitance change that occurs when a body or a particular object approaches. A traditional method for detecting the capacitance change induces charge into the capacitive sensor by using a large capacity capacitor and measures a time when a charging voltage of the capacitor becomes a reference voltage. The method as stated above needs be charged and discharged a number of times because an amount of induced charge into the capacitive sensor is small, and the capacitive sensor is affected by surrounding environment or noise.

Another traditional method for detecting a capacitance change induces charge into a capacitive sensor by a set number of times and measures a voltage change according to discharging time of induced charge. The method as stated above measure a discharging voltage of specific point of time, so that the discharging voltage is affected by surrounding environment or noise. As a result, the traditional methods have a possibility to misdetection of the capacitance change of the capacitive sensor.

The above information disclosed in this Background section is only for enhancement of understanding of the background of the disclosure, and therefore, it may contain information that does not form the prior art that is already known in this country to a person of ordinary skill in the art.

SUMMARY

The present disclosure provides an apparatus of detecting capacitance having advantages of charging/discharging a capacitive sensor by a set number of times and preventing a malfunction according to a noise.

According to an exemplary embodiment of the present disclosure, an apparatus of detecting capacitance may include a pulse modulator configured to output a charging signal including at least one pulse. A switch is configured to charge a capacitive sensor according to the charging signal and output a discharging signal from the capacitive sensor. A discharging compensator is configured to output a discharging delay signal by compensating a voltage level of the discharging signal during a falling period of the discharging signal. A detector is configured to output a detection signal by detecting a region where the discharging delay signal has a voltage threshold. A controller is configured to detect the capacitance change by measuring a discharging time of the capacitive sensor according to the detection signal.

The pulse modulator may receive an input signal including at least one pulse from the controller and may output the charging signal by modulating a pulse width of the input signal.

The pulse modulator may include an inverter configured to output an inverting input signal by inverting the input signal. A delayer is configured to output an input delay signal by delaying the inverting input signal for a set period of time. A first negated and (NAND) gate is configured to output an output signal by executing a NAND operation of the input signal and the input delay signal. A second NAND gate is configured to output the charging signal by executing a NAND operation of the output signal and a high level signal.

The delayer may include a resistance having both ends, one end of the resistance connected to output end of the inverter. A capacitor includes one end connected to the other end of the resistance and the other end connected to a ground terminal.

The discharging compensator may receive a compensation signal including a pulse which has constant size from the controller, and may increase a voltage level of the discharging signal by using the compensation signal.

The discharging compensator may include a discharging delayer configured to output a compensation delay signal by delaying the compensation signal for a set period of time. An adder is configured to output the discharging delay signal by adding the discharging signal and the compensation delay signal.

The discharging delayer may include a resistance having both ends, the compensation signal being transmitted to one end of the resistance. A capacitor includes one end connected to the other end of the resistance and the other end connected to the ground terminal.

The detector may include a NAND gate configured to receive an input signal which has a pulse width corresponding to the voltage threshold and output the detection signal by executing the NAND operation of the input signal and the discharging delay signal.

The apparatus may further include a signal processor configured to output a voltage signal corresponding to a duty ratio of the detection signal. The signal processor may include a charge amplifier.

The controller may charge the capacitive sensor by a set number of times and may detect the capacitance change by using an average value of the discharging time about the set number of times.

An apparatus of detecting capacitance according to an exemplary embodiment of the present disclosure may decrease charging and discharging number of times since the capacitive sensor is charged and discharged by a predetermined number of times.

In addition, the apparatus of detecting capacitance according to an exemplary embodiment of the present disclosure may acquire strength against a noise by detecting a discharging signal of a voltage threshold after delaying a discharging time by increasing voltage level of the discharging signal from the capacitive sensor.

DETAILED DESCRIPTION OF THE EMBODIMENTS

Figure 1:
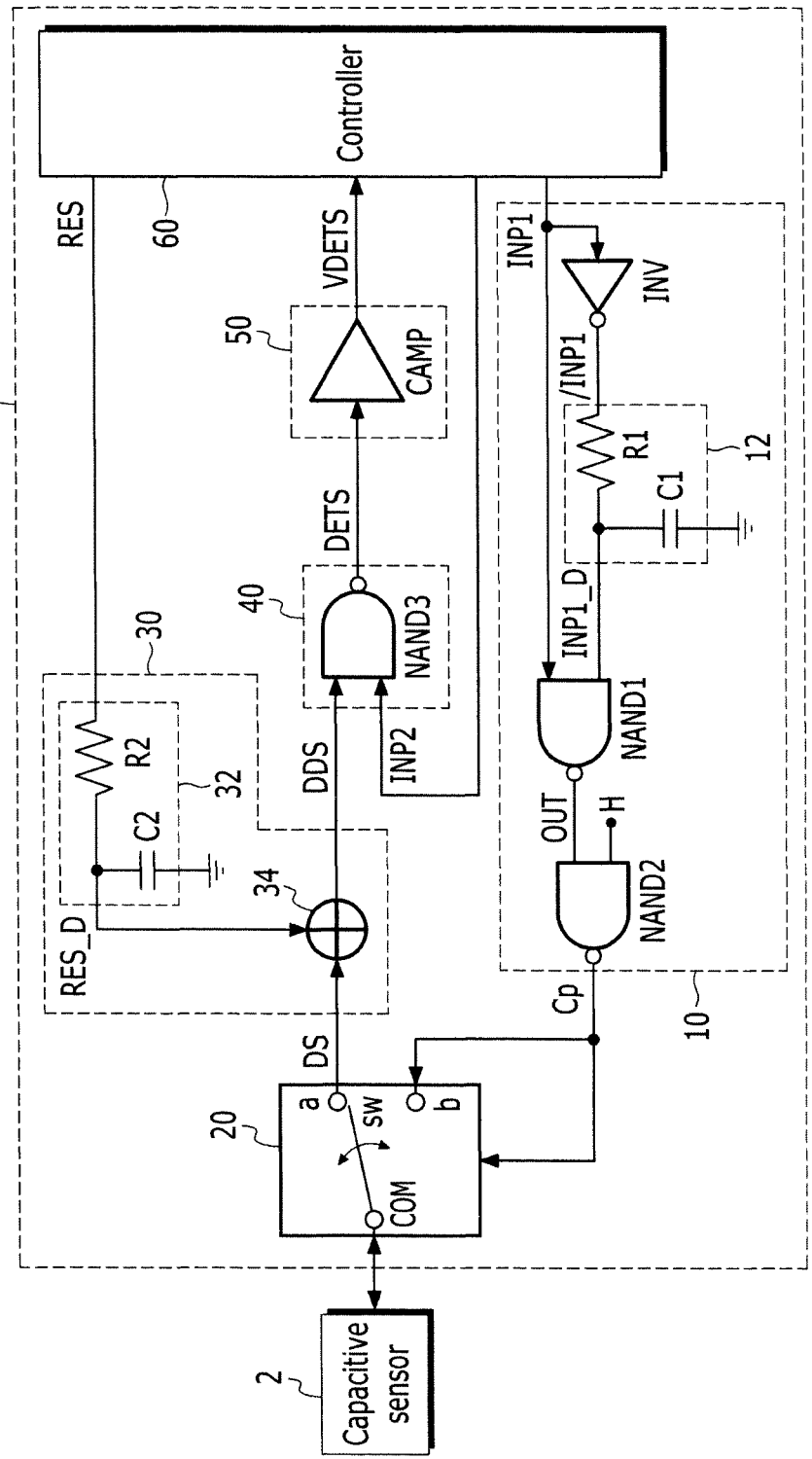
FIG. 1 is a circuit diagram of an apparatus of detecting capacitance according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Hereinafter, the exemplary embodiment of the present disclosure will be described in detail with reference to the accompanying drawings.

FIG. 1 is a circuit diagram of an apparatus of detecting capacitance according to an exemplary embodiment of the present disclosure. Referring to FIG. 1, an apparatus of detecting capacitance 1 according to an exemplary embodiment of the present disclosure include a pulse modulator 10, a switch 20, a discharging compensator 30, a detector 40, a signal processor 50, and a controller 60.

The pulse modulator 10 receives a first input signal INP1 including at least one pulse from the controller 60 and output a charging signal CP by to modulating a pulse width the first input signal INP1. For example, a pulse width of the first input signal INP1 may be approximately 200 μs, and a pulse width of the charging signal CP may be approximately 20 ns. In this regard, a charging time may be shortened if a capacitive sensor 2 is charged by the charging signal CP with a pulse shape.

The pulse modulator 10 includes an inverter INV, a delayer 12, a first negated and (NAND) gate NAND1, and a second NAND gate NAND2. The inverter INV outputs an inverting input signal /INP1 by inverting the first input signal INP1.

The delayer 12 outputs a first input delay signal INP1_D by delaying the inverting input signal /INP1 for a set period of time. At this point, the delayer 12 controls a delaying time of the inverting input signal /INP1 depending on a RC time constant. To this end, the delayer 12 includes a first resistance R1 and a first capacitor C1. The first resistance R1 includes one end connected to output end of the inverter INV and the other end connected to one end of the first capacitor C1. The other end of the first capacitor C1 is connected to a ground terminal.

The first NAND gate NAND1 outputs an output signal OUT by executing a NAND operation of the first input signal INP1 and the first input delay signal INP1_D. The second NAND gate NAND2 outputs the charging signal CP by executing NAND operation of the output signal OUT and a high level signal H.

The switch 20 controls charging and discharging of the capacitive sensor 2 depending on the charging signal CP. To this end, the switch 20 includes a switch SW. The switch SW connects a common terminal (com) connected to the capacitive sensor 2 to a discharging terminal (a) during a low level region of the charging signal CP. The switch SW connects a common terminal (com) to a charging terminal (b) during a high level region of the charging signal CR That is, if the common terminal (com) is connected to the discharging terminal (a), a discharging channel of the capacitive sensor 2 is formed, on the contrary, if the common terminal (com) is connected to the charging terminal (b), a charging channel of the capacitive sensor 2 is formed.

If the charging channel of the capacitive sensor 2 is formed, the capacitive sensor 2 is charged as a reference voltage level by receiving the charging signal CP from the pulse modulator 10. On the contrary, if the discharging channel of the capacitive sensor 2 is formed, the capacitive sensor 2 is discharged and outputs a discharging signal DS. At this point, a discharging time of the discharging signal DS changes in accordance with changing a discharging amount when a body or a particular object approaches to the capacitive sensor 2.

The discharging compensator 30 delays the discharging time of the discharging signal DS by compensating a voltage level of the discharging signal DS during a falling region of the discharging signal DS. In more detail, the discharging compensator 30 receives a compensation signal RES from the controller 60 and outputs a compensation delay signal DDS by increasing the voltage level of the discharging signal DS on the basis of the compensation signal RES. At this point, the compensation signal RES includes a pulse which has a constant size. The discharging compensator 30 includes a discharging delayer 32 and an adder 34. The discharging delayer 32 receives the compensation signal RES from the controller 60 and outputs a compensation delay signal RES_D by delaying the compensation signal RES depending on a RC time constant.

The discharging delayer 32 includes a second resistance R2 and a second capacitor C2. The second resistance R2 includes one end receives the compensation signal RES and the other end connected to the second capacitor C2. The other end of the second capacitor C2 is connected to ground terminal. In addition, the adder 34 outputs the compensation delay signal DDS by adding the discharging signal DS and the compensation delay signal RES_D.

The detector 40 receives a second input signal INP2 and outputs a detection signal DETS by detecting a region where the compensation delay signal DDS has a voltage threshold depending on the second input signal INP2. For example, the detector 40 may detect a region where the compensation delay signal DDS has a range of 2.5-5 V. In this regard, the second input signal INP2 has a pulse width corresponding to a maximum time that the compensation delay signal DDS may change as the voltage threshold. The detector 40 includes a third NAND gate NAND3. The third NAND gate NAND3 outputs a detection signal DETS by executing NAND operation of the second input signal INP2 and the discharging delay signal DDS.

The signal processor 50 outputs a voltage signal VDETS by converting an electric signal corresponding to a duty ratio of the detection signal DETS. To this end, the signal processor 50 includes a charge amplifier CAMP that converts an input charge amount to a voltage and amplifies a voltage level. The charge amplifier CAMP may adjust a sensitivity of an output signal about an input signal and prevent the voltage signal VDETS from being influencing by a noise.

The controller 60 generates a first input signal INP1, a second input signal INP2, and a compensation signal RES. The controller 60 transmits the first input signal INP1 to the pulse modulator 10, transmits the second input signal INP2 to the detector 40, and transmits the compensation signal RES to the discharging delayer 32. In addition, the controller 60 detects a capacitance change of the capacitive sensor 2 by determining the voltage signal VDETS. The controller 60 may include an analog-digital converter (not shown) which converts the voltage signal VDETS to a digital format. For example, the controller 60 may measure a discharging time of the capacitive sensor 2 that the discharging delay signal DDS has the voltage threshold according to a voltage level of the voltage signal VDETS. The controller 60 may detect the capacitance change by comparing the measured discharging time with a set discharging standard time.

The discharging standard time means that the discharging delay signal DDS has the voltage threshold when the body or the particular object does not approach to the capacitive sensor 2. That is, the controller 60 may determine that the body or the particular object approaches to the capacitive sensor 2 when the measured discharging time is longer than the discharging standard time. In addition, the controller 60 may charge the capacitive sensor 2 by a predetermined number of times and may measure the discharging time of the capacitive sensor 2 every number of times. The controller 60 may detect the capacitance change of the capacitive sensor 2 based on an average of the discharging time.

The apparatus of detecting capacitance 1 according to an exemplary embodiment of the present disclosure may be applied to a module for opening and closing a trunk of a vehicle when a driver approaches to the trunk of the vehicle. The controller 60 may transmit a data whether a body or a particular object approaches or not to a controller for opening and closing the trunk of the vehicle (not shown).

Figure 2:
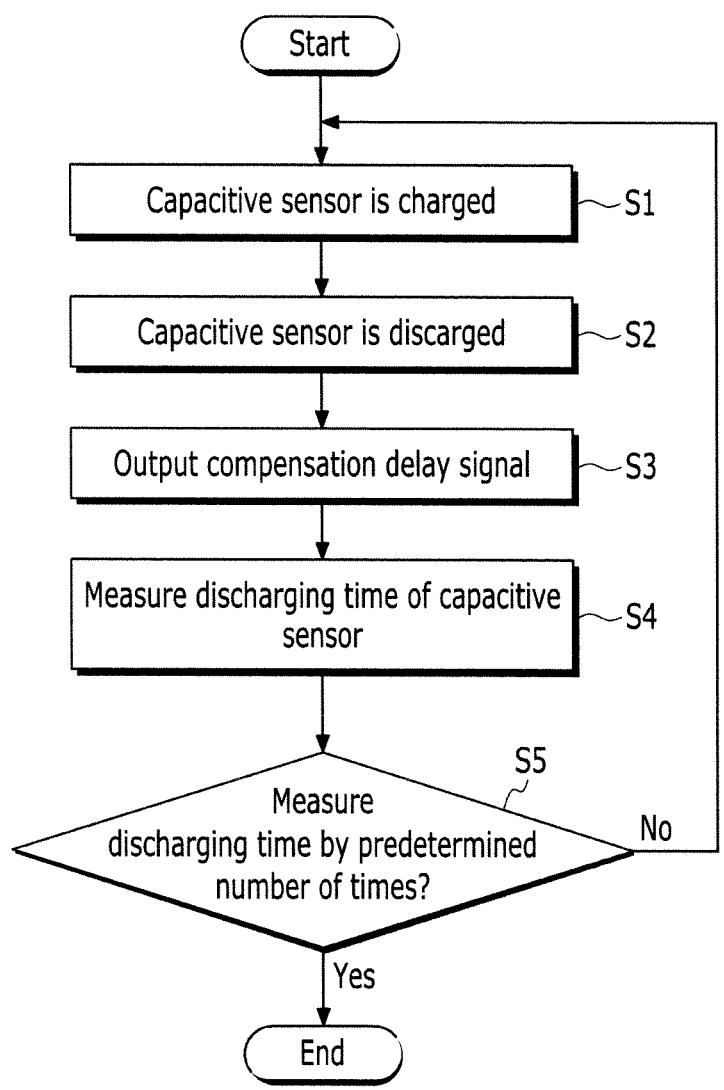
FIG. 2 is a flowchart showing a method of detecting capacitance according to an exemplary embodiment of the present disclosure.

FIG. 2 is a flowchart showing a method of detecting capacitance according to an exemplary embodiment of the present disclosure. Referring to FIG. 2, the pulse modulator 10 outputs a charging signal CP by modulating a pulse width the first input signal INP1. If the pulse modulator 10 outputs the charging signal CP, the charging channel of the capacitive sensor 2 is formed during the high level region of the charging signal CP, and the capacitive sensor 2 is charged through the charging channel at step S1.

After that, the discharging channel of the capacitive sensor 2 is formed during the low level region of the charging signal CP, and the capacitive sensor 2 is discharged through the discharging channel at step S2. At this time, a waveform of the discharging signal DS output from the capacitive sensor 2 changes when the body or the particular object approaches to the capacitive sensor 2.

The discharging compensator 30 outputs the compensation delay signal DDS by compensating a voltage level of the discharging signal DS during a falling region of the discharging signal DS at step S3. After that, the detector 40 outputs the detection signal DETS by detecting a region where the compensation delay signal DDS has a voltage threshold depending on the second input signal INP2.

The signal processor 50 outputs the voltage signal VDETS depending on a duty ratio of the detection signal DETS, and the controller 60 measures the discharging time that the discharging delay signal DDS has the voltage threshold at step S4.

After that, the controller 60 determines whether to measure the discharging time by a set number of times at step S5. If the discharging time is not measured by the set number of times, the controller 60 returns a process to the step S1 and performs the process again.

On the other hand, if the discharging time is measured by the set number of times, the controller 60 detects the capacitance change of the capacitive sensor 2 by using an average of the discharging time measured by the set number of times.

Figure 3:
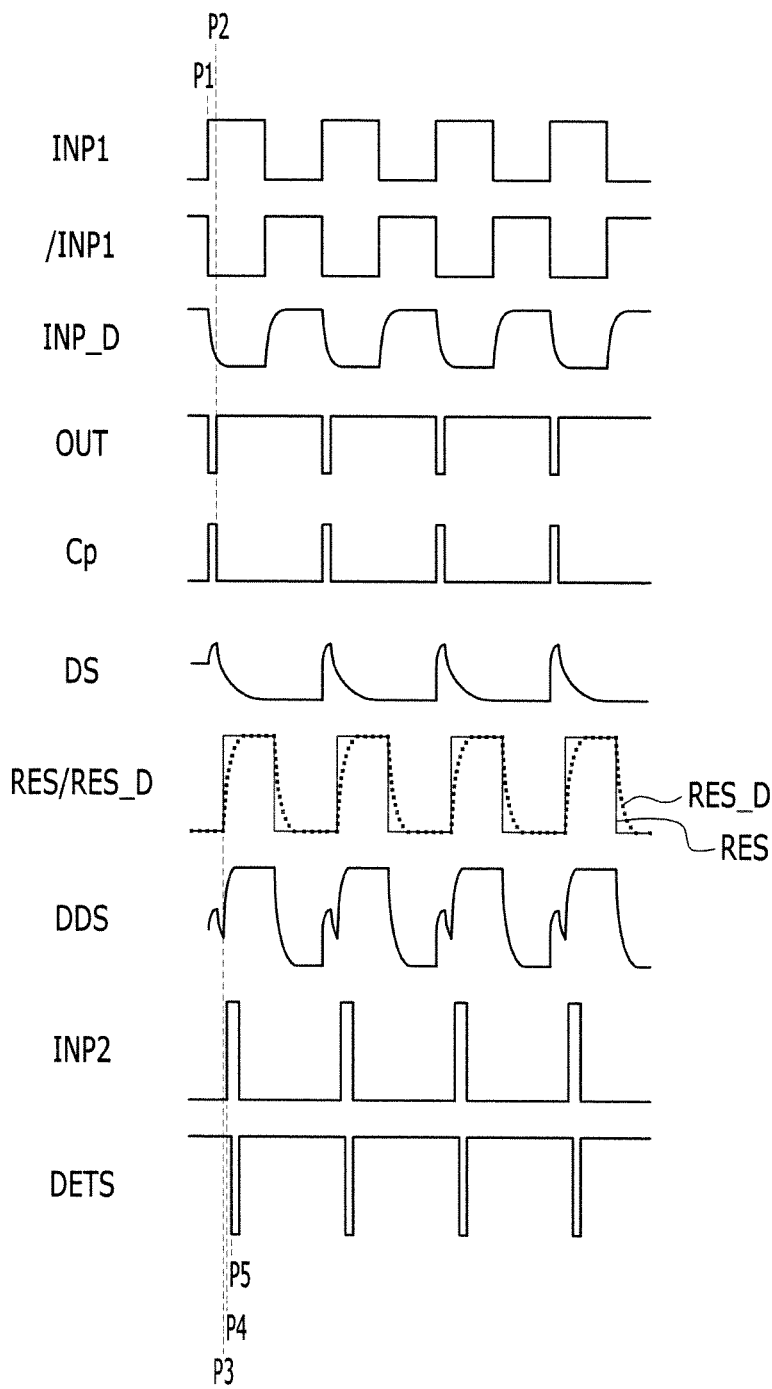
FIG. 3 is operation timing chart of an apparatus of detecting capacitance according to an exemplary embodiment of the present disclosure.

FIG. 3 is a operation timing chart of an apparatus of detecting capacitance according to an exemplary embodiment of the present disclosure. Referring to FIG. 3, the controller 60 generates the first input signal INP1 and outputs first input signal INP1 at a point of time P1. The inverter INV outputs the inverting input signal /INP1 by inverting the first input signal INP1, the delayer 12 outputs the first input delay signal INP1_D by delaying the inverting input signal /INP1. Then, the first NAND gate NAND1 outputs the output signal OUT by executing a NAND operation of the first input signal INP1 and the first input delay signal INP1_D. In addition, the second NAND gate NAND2 outputs the charging signal CP by executing a NAND operation of the output signal OUT and a high level signal H.

At this time, the switch SW connects the common terminal (com) to the charging terminal (b) during a high level region of the charging signal CP. If the common terminal (com) and the charging terminal (b) are connected, the capacitive sensor 2 is charged as a predetermined voltage level depending on the charging signal CP. After that, the charging signal CP drops from the high level region to the low level region, and the switch SW connects the common terminal (com) to the discharging terminal (a) at a point of time P2. As a result, the capacitive sensor 2 is discharged, so the discharging signal DS is output.

The controller 60 generates the compensation signal RES and outputs the compensation signal RES at a point of time P3. The discharging delayer 32 outputs the compensation delay signal RES_D by delaying the compensation signal RES. If the compensation delay signal RES_D is output, the adder 34 outputs the compensation delay signal DDS by adding the discharging signal DS and the compensation delay signal RES_D. Then, the controller 60 generates the second input signal INP2 and outputs the second input signal INP2 at a point of time P4. If the second input signal INP2 is output, the third NAND gate NAND3 outputs the detection signal DETS by executing NAND operation of the second input signal INP2 and the discharging delay signal DDS.

The signal processor 50 outputs the voltage signal VDETS depending on a duty ratio of the detection signal DETS, and the controller 60 measures the discharging time of the capacitive sensor 2 by using the voltage signal VDETS. After that, the operation as described above is repeated by a predetermined number of times, for example four times. The controller 60 detects capacitance change of the capacitive sensor 2 by using an average of the discharging time of the capacitive sensor 2 measured by four times.

While this disclosure has been described in connection with what is presently considered to be practical exemplary embodiments, it is to be understood that the disclosure is not limited to the disclosed embodiments, on the contrary, is intended to cover various modifications and equivalent arrangements included within the spirit and scope of the appended claims.

What is claimed is:

1. An apparatus of detecting capacitance which detects a capacitance change of a capacitive sensor, the apparatus comprising:
 a pulse modulator configured to output a charging signal including at least one pulse;
 a switch configured to charge the capacitive sensor according to the charging signal and output a discharging signal from the capacitive sensor;
 a discharging compensator configured to output a discharging delay signal by compensating a voltage level of the discharging signal during a falling period of the discharging signal;
 a detector configured to output a detection signal by detecting a region where the discharging delay signal has a voltage threshold; and
 a controller configured to detect the capacitance change by measuring a discharging time of the capacitive sensor according to the detection signal,
 wherein the discharging compensator receives a compensation signal including a pulse which has a constant size from the controller, and increases the voltage level of the discharging signal by using the compensation signal, and
 wherein the discharging compensator comprises: a discharging delayer configured to output a compensation delay signal by delaying the compensation signal for a set period of time; and an adder configured to output the discharging delay signal by adding the discharging signal and the compensation delay signal.

2. The apparatus of claim 1, wherein the pulse modulator receives an input signal including the at least one pulse from the controller and outputs the charging signal by modulating a pulse width of the input signal.

3. The apparatus of claim 2, wherein the pulse modulator comprises:
 an inverter configured to output an inverting input signal by inverting the input signal;
 a delayer configured to output an input delay signal by delaying the inverting input signal for a set period of time;
 a first negated and (NAND) gate configured to output an output signal by executing a NAND operation of the input signal and the input delay signal; and
 a second NAND gate configured to output the charging signal by executing a NAND operation of the output signal and a high level signal.

4. The apparatus of claim 3, wherein the delayer comprises:
 a resistance having both ends, one end of the resistance connected to an output end of the inverter; and
 a capacitor including one end connected to another end of the resistance and the other end connected to a ground terminal.

5. The apparatus of claim 1, wherein the discharging delayer comprises:
 a resistance having both ends, the compensation signal being transmitted to one end of the resistance; and
 a capacitor including one end connected to another end of the resistance and the other end connected to a ground terminal.

6. The apparatus of claim 1, wherein the detector comprises a NAND gate configured to receive an input signal which has a pulse width corresponding to the voltage threshold and output the detection signal by executing a NAND operation of the input signal and the discharging delay signal.

7. The apparatus of claim 1, the apparatus further comprises a signal processor configured to output a voltage signal corresponding to a duty ratio of the detection signal.

8. The apparatus of claim 7, wherein the signal processor comprises a charge amplifier.

9. The apparatus of claim 1, wherein the controller charges the capacitive sensor by a set number of times and detects the capacitance change by using an average value of the discharging time about the set number of times.

\* \* \* \* \*